United States Patent Office 2,921,945
Patented Jan. 19, 1960

2,921,945
YELLOW DIPHENYLAMINE DYES

John R. Adams, Jr., Summit, and Victor S. Salvin, New Providence, N.J., assignors to Celanese Corporation of America, New York, N.Y., a corporation of Delaware No Drawing. Application May 17, 1954
Serial No. 430,409

4 Claims. (Cl. 260—397.7)

This invention relates to dyeing and relates more particularly to the dyeing of an organic derivative of cellulose textile material with novel yellow dyestuffs.

It is an important object of this invention to provide novel yellow dyestuffs for textile materials.

Another object of this invention is the provision of novel dispersed cellulose acetate dyestuffs which, when dyed on cellulose acetate or other organic derivative of cellulose, yield colored materials of improved wash fastness.

It is a further object of this invention to provide a novel method for the dyeing of textile materials to produce colored materials of improved wash fastness.

Other objects of this invention will be apparent from the following detailed description and claims.

In accordance with this invention there are produced yellow dyestuffs of the formula

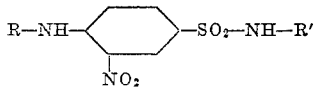

where both R and R' are aryl radicals and in which one of said R and R' radicals carries a carboxyl group. The aryl radicals may also carry other substituents such as alkoxy, halogens, acylamino, hydroxyl, acyl, hydroxyalkoxy, or hydroxyalkyl. Examples of suitable aryl radicals free of carboxyl groups are phenyl; naphthyl; biphenyl; alkyl phenyl; aralkylphenyl; alkoxyphenyl; halogenophenyl, acylaminophenyl, hydroxyphenyl; acylphenyl; hydroxyalkoxyphenyl; and hydroxyalkylphenyl radicals. Examples of suitable aryl radicals carrying carboxyl groups are o-, m- and p-carboxyphenyl radicals, and substitution products of such carboxyphenyl radicals, e.g. alkyl carboxyphenyl, hydroxycarboxyphenyl, alkoxycarboxyphenyl, hydroxyalkyl carboxyphenyl, acylaminocarboxy phenyl, halogenocarboxyphenyl, hydroxyalkoxycarboxyphenyl, acylcarboxyphenyl, aralkylcarboxyphenyl, or carboxybiphenyl radicals.

In one convenient process for the production of the novel dyestuffs of this invention there is prepared, as a first step, a compound having the structure

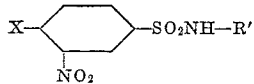

where R' has the meaning given above and where X is a halogen, such as chlorine or bromine, as by reacting a 4-chloro-3-nitrobenzenesulfonyl halide, e.g. a chloride or bromide, with an aromatic primary amine, e.g. aniline toluidine, anisidine, phenetidine, aminoacetanilide, chloraniline, hydroxyethyl aniline, aminophenol, acetyl aniline, benzyl aniline, hydroxyethoxyaniline, or with an aromatic aminocarboxylic acid, such as aminobenzoic acid, aminotoluic acid, aminonaphthoic acid, aminophenyl benzoic acid, ethoxy aminobenzoic acid, aminosalicylic acid, or aminobenzoic acid carrying an acetyl, benzyl, chloro, hydroxyethyl or hydroxyethoxyethyl substituent on the aromatic ring. The resulting compound is then reacted with an aromatic aminocarboxylic acid or aromatic amine in the presence of an acid-binding agent to introduce the radical R, described above, and to produce the desired novel dyestuff.

Specific dyestuffs within the scope of this invention are, for example, 2-nitrodiphenylamine-4-sulfon (o-, m- or p-carboxy) anilide, 4'-carboxyl-2-nitrodiphenylamine-4-sulfanilide, 2-nitrodiphenylamine - 4-sulfon (p-hydroxy-m-carboxy) anilide, 4'-ethoxy-2-nitrodiphenylamine - 4-sulfon (p-carboxy) anilide, 4'-methoxy-2-nitrodiphenylamine-4-sulfon (p-carboxy) anilide, 2-nitrodiphenylamine-4 - sulfon (m-hydroxyethyl p-carboxy) anilide and 4'-methyl-2 - nitrodiphenylamine - 4 - sulfon (p-carboxy) anilide.

The novel dyestuffs of this invention have a substantive affinity for cellulose acetate and other organic derivative of cellulose materials and also for polyamides such as nylon. In addition these dyestuffs yield dyeings of good wash fastness, which wash fastness may be further improved by reacting the dyestuffs in the fiber with cationic resin-forming materials and with certain metallic compounds. Thus, the wash fastness of textile materials colored with the dyestuffs of this invention is improved by treating said textile materials with a cationic heat-curable amine-formaldehyde condensate and heat-treating to cure said condensate. Also, the wash fastness is improved by a treatment with other cationic materials, such as copper-containing fixative agents of the type usually employed for the fixing of direct dyes on cellulose fibers. Still further improvement in wash fastness is obtained by treating the dyed textile material with both the cationic amine-formaldehyde condensate and the copper-containing fixative agent.

The dyestuffs of this invention may be used for the dyeing of blends of fibers of cellulose acetate or other organic derivatives of cellulose with fibers of cellulose, e.g. viscose rayon fibers. Where a union dyeing is desired the dyestuffs of this invention may be applied to the blend together with the usual direct dyestuffs for cellulose material. Especially good results are obtained, in this connection, when said direct dyestuffs are those which are reactive with a metal-containing fixative agent and when the resulting dyed blend is treated with said fixative agent and also, advantageously, with a cationic amine-formaldehyde condensate.

The yellow dyestuffs of this invention may also be applied in combination with additional dispersed cellulose acetate dyestuffs of other colors to produce any desired mixed shades on cellulose acetate or other organic derivative of cellulose materials. Thus, the dyestuffs of this invention may be mixed with red or blue dispersed cellulose acetate dyestuffs of the types which are fixed on the fiber by reaction with either amine-formaldehyde condensates or metal-containing fixative agents, or both. Such dyestuffs are disclosed in the copending application of Conciatori et al., Ser. No. 430,411, filed on even date herewith, now Patent No. 2,880,052. Where the textile material being dyed in a mixed shade comprises cellulose fibers, in addition to cellulose acetate or other organic derivative of cellulose, the dyebath may also include a direct dyestuff, as described above. The resulting dyed material may then be treated with a metal-containing fixative agent and a cationic amine-formaldehyde condensate, desirably together with a non-cationic amidogen-formaldehyde condensate, e.g. a condensate of formaldehyde with urea or with a cyclic urea such as ethylene urea, as described in the aforesaid copending application of Conciatori et al.

As stated, the novel dyestuffs of this invention also have a substantive affinity for polyamides such as nylon. Accordingly, these dyestuffs are very suitable for the union dyeing of blends of cellulose acetate, or other organic derivative of cellulose, with nylon. Thus a blend containing cellulose acetate, rayon and nylon may be dyed with a mixture of the dyestuffs of this invention and other dyestuffs (e.g. direct dyestuffs and other dispersed cellulose acetate dyestuffs as described above) and the dyed material may be treated with fixative agent and cationic amine-formaldehyde condensate, as described above.

The dyestuffs of this invention are desirably applied to the textile material from aqueous dispersions of said dyestuffs. The affinity of these dyestuffs for cellulose acetate or nylon is greatest when the aqueous dyebath is acidic, preferably slightly acidic. Best results are obtained when the pH of the dyebath is about 5.5 to 6.0. Preferably the dyebath contains an acidifying agent, such as acetic acid, ammonium sulfate, or formic acid. Ammonium sulfate is a preferred acidifying agent since its use results in dyeings which are most level. The dyebath should also contain a dispersing agent for the dyestuff. Very good results are obtained when the dispersing agent is the sodium salt of oleyl taurate or a heptadecyl benzimidazol disulfonate, such as that known as "Ultravon W." The dyebath may also contain minor amounts of softening or swelling agents for cellulose acetate, such as monobutyl ether of diethylene glycol or triethyl phosphate, if desired. The dyebath should be heated, e. g. to a temperature of about 80° to 95° C.

In the processes wherein a plurality of dyestuffs are employed, e.g. when mixed shades are produced or when direct dyes are used, as in the dyeing of blends of cellulose acetate and rayon with or without nylon, the dyestuffs are preferably all present in a single aqueous dyebath. However, the dyestuffs may be applied successively to the textile material, if desired.

The cationic amine-formaldehyde condensates used for treating textile material dyed in accordance with this invention include heat-curable condensation products of formaldehyde with polyaminotriazines, such as melamine or formoguanamine, or with other amino compounds, e.g. dicyandiamide, guanidine or guanylurea. Such condensation products contain N-hydroxymethyl groups. Preferably, however, the N-hydroxymethyl groups are etherified with a lower aliphatic alcohol, e.g. methyl or ethyl alcohol, to form N-alkoxymethyl groups. Very good results have been obtained by the use of such condensates as N,N'-di and N,N'N''-tri (methoxymethyl) melamine. The cationic amine-formaldehyde condensate is basic, and it would appear that it probably forms a salt with the carboxy-containing dyestuffs of this invention. Non-cationic amidogen-formaldehyde condensates, such as urea-formaldehyde condensates, do not have the desired effect of substantially improving the wash fastness of material dyed solely with the dyestuffs of this invention.

The cationic amine-formaldehyde condensate is desirably applied to the dyed textile material in the form of an aqueous dispersion thereof, as by padding an aqueous solution thereof onto the dyed textile material. Thereafter the textile material is dried and then heated to cure the amine-formaldehyde condensate, suitable curing temperatures being about 150 to 175° C. The amount of cationic amine-formaldehyde condensate applied to the textile material is generally on the order of about 2 to 10%, based on the weight of the fabric.

It is advantageous to carry out the curing of the cationic amine-formaldehyde condensate in the presence of a catalyst which is acidic at the temperature of curing. Examples of suitable catalysts are ammonium chloride or sulfate, oxalic acid, "Catalyst G-8" (an amine hydrochloride containing free formaldehyde and hydrochloric acid), and alkanolamine hydrochlorides such as that known as "Accelerator UTX." The catalyst is desirably applied to the textile material from the same bath as the amine-formaldehyde condensate. However, since the catalyst tends to cause progressive polymerization of the amine-formaldehyde condensate, even at room temperature, the bath containing these two ingredients should be used promptly and not permitted to stand around for long periods of time. Suitable amounts of catalyst are, for example, about 2 to 10% based on the weight of the amine-formaldehyde condensate.

As stated, the metal-containing fixative agent is desirably of the type usually employed for the fixing of direct dyes on cellulose fibers. Examples of suitable metal-containing fixative agents of this type are those disclosed in U.S. Patent No. 2,573,489 and those sold under the name "Cuprofix," the fixative agent known as "Cuprofix 47" being particularly suitable. The fixative agent is desirably applied to the dyed textile material in the form of an aqueous solution thereof. Advantageously, the fixative agent and the cationic amine-aldehyde condensate are applied from a single padding bath. Suitable amounts of fixative agent are about 1 to 3% based on the weight of the textile material.

The following examples are given to illustrate this invention further.

*Example I*

25 parts by weight of p-aminobenzoic acid are dissolved in 200 parts of water by making the water alkaline, to a pH of 8, with sodium carbonate. To the resulting mixture there are added over a period of 15 minutes, with stirring, 30 parts by weight of a wet mixture containing 5 parts by weight of water and the balance 4-chloro-3-nitrobenzene sulfonyl chloride. After the addition is completed the mixture is stirred at 25° C. for 3 hours, during which time the pH is maintained slightly alkaline (i.e. at a pH of about 7.5 to 8.5) by the addition of small amounts of sodium carbonate. Thereafter the reaction mixture is diluted with three times its volume of water and then acidified by the addition of glacial acetic acid. The resulting precipitate is recovered by filtration and washed thoroughly with water, yielding 34.7 parts by weight of a product melting at 190 to 200° C. and consisting essentially of 4-chloro-3-nitrobenzenesulfanilide-4'-carboxylic acid. On further purification, by recrystallization from ethanol, there is obtained a product melting at 230 to 232° C.

*Example II*

A mixture of 300 parts by weight of the 4-chloro-3-nitrobenzenesulfanilide-4'-carboxylic acid, obtained in accordance with Example I, 150 parts by weight of sodium carbonate, 255 parts by weight of freshly distilled aniline and 3000 parts by weight of water are heated with stirring at reflux for 20 hours. The reaction mixture is cooled, diluted with three times its volume of water and made acid with concentrated hydrochloric acid, while the mixture is agitated vigorously, whereupon a precipitate forms. This precipictate is filtered off, washed thoroughly with water and dried. The dried precipitate is purified by heating it in 10 to 15 times its weight of ethanol at the boil, adding just enough benzene to effect complete solution of the precipitate, and then cooling the solution in an ice bath to cause reprecipitation. 212 parts by weight of a yellow dyestuff melting at 232–233° C. and consisting essentially of 2-nitro-diphenylamine-4-sulfon-p-carboxyanilide are obtained.

*Example III*

The process of Example II is repeated except that acetic acid is employed in place of hydrochloric acid for the acidification of the reaction mixture obtained by reacting the aniline and the 4-chloro-3-nitrobenzenesulfanilide-4'-carboxylic acid. The resulting precipitate is gummy but hardens gradually. The hardened product is crushed under water and then purified as in Example II.

Example IV 1 part by weight of the dyestuff of Example II is dispersed in 30 parts by weight of water with the aid of 10 parts by weight of "Igepon T Gel" (comprising sodium oleyl taurate) and the dispersion is added to 6950 parts by weight of water, following which 25 parts by weight of ammonium sulfate are added. 100 parts by weight of a cellulose acetate satin fabric are dyed for 1 hour at a temperature of 80 to 85° C. in the resulting dyebath. The fabric is dyed yellow and is fast to washing at 120° F.

Example V

Examples I and II are repeated except that m-aminobenzoic acid is employed in place of the p-aminobenzoic acid. The yellow dyestuff 2-nitrodiphenylamine-4-sulfon-m-carboxyanilide is obtained. This dyestuff is applied to cellulose acetate in accordance with the procedure set forth in Example IV. The resulting dyed fabric is slightly lighter in color than the fabric of Example IV but has the same fastness to washing.

Example VI

Examples I and II are repeated except that o-aminobenzoic acid is employed in place of the p-aminobenzoic acid. The yellow dyestuff 2-nitrophenylamine-4-sulfon-o-carboxyanilide is obtained. This dyestuff is applied to cellulose acetate in accordance with the procedure set forth in Example IV. The resulting dyed fabric is slightly lighter in color than the fabric of Example IV but has the same fastness to washing.

Example VII 8.4 parts by weight of 4-chloro-3-nitrobenzene-sulfonyl chloride, 0.5 parts by weight of the wetting agent "Nekal BX-76" (diisobutylnaphthalene sulfonic acid) and 30 parts by weight of water are thoroughly milled together. 20 parts of water are then added, following which the mixture is made just alkaline to Brilliant Yellow indicating paper by the addition of sodium bicarbonate and then heated to 60° C. with agitation. 6 parts by weight of freshly distilled aniline are added over a period of 20 minutes in small increments to the heated stirred mixture. After each increment is added, sufficient sodium bicarbonate is added to adjust the pH of the mixture to alkalinity to Brilliant Yellow. Thereafter, the reaction mixture is stirred at 60° C. and then cooled, diluted with 300 parts by weight of water and filtered to separate out the solid reaction product, which is washed thoroughly with water and dried. 8.5 parts by weight of 4-chloro-3-nitrobenzenesulfanilide is obtained.

Example VIII

A mixture of 8 parts by weight of 4-chloro-3-nitrobenzenesulfanilide, obtained according to Example VII, 7 parts by weight of sodium carbonate, 300 parts by weight of water and 5 parts by weight of p-aminobenzoic acid are heated at reflux for 20 hours. After cooling the reaction mixture is diluted to a total weight of 1000 parts with water and acidified with 10 parts of acetic acid. The precipitated product is filtered off, washed with water, dried and recrystallized from 20 parts of ethanol, yielding 4 parts by weight of 4'-carboxy-2-nitrodiphenylamine-4-sulfanilide melting at 242 to 243° C.

Example IX

Examples I and II are repeated except that o-hydroxy-m-aminobenzoic acid is employed in place of the p-aminobenzoic acid. The yellow dyestuff 2-nitrodiphenylamine-4-sulfon (p-hydroxy-m-carboxy)anilide, melting at 209 to 211° C., is obtained.

Example X

To the dyed fabric of Example IV there is applied by padding from an aqueous solution 5% based on the weight of the fabric of trimethylolmelamine and .5% on the weight of the fabric of a mixture of organic amine hydrochloride and formaldehyde known as "Catalyst G-8." The fabric is dried and cured in an oven at 160° C. for 5 minutes. The fabric is then subjected to the #3 A.A.T.C.C. wash fastnes test, involving washing at 160° F. Only 6.2% of the dyestuff originally present in the dyed fabric is lost. In contrast, the untreated dyed fabric of Example IV loses 22% of the dyestuff when subjected to the same test.

Example XI

A fabric consisting of 40% cellulose acetate, 40% viscose rayon and 20% nylon (specifically the polyamide of hexamethylene diamine and adipic acid) is dyed at 85° C. from a dyebath containing 1 gram per liter of "Igepon T Gel" and 2 grams per liter of ammonium sulfate with the following dyestuffs including the yellow dyestuff of Example II and in a liquor ratio of 50:1. The dyeing formulation based on fabric weight is:

.15% "Eastman Blue GLF," a blue anthraquinone dyestuff for cellulose acetate,
.24% "Amacel Red 2B," a red azo dyestuff for cellulose acetate,
.78% 2-nitrodiphenylamine-4-sulfon-p-carboxyanilide,
.09% "Resofix Blue GWN,"
.27% "Resofix Yellow GW,"
.2% "Cuprofix Rubine BWN," all of the latter three being fixable direct dyestuffs for rayon.

To this dyed fabric there is applied by padding from aqueous solution 8% by weight of trimethylolmelamine, 2% by weight of "Cuprofix 47" and .8% by weight of "Catalyst G8," based on the fabric weight. The fabric is dried and cured at 160° C. for 5 minutes.

The fabric shows good union dyeing for the yellow between the acetate and the nylon. The blend shows good wash fastness at the #3 A.A.T.C.C. test. The rayon dyes show excellent fixation and the cellulose acetate dyes on both the nylon and the cellulose acetate show only a slight shade change and slight staining, i.e. a shade change and staining corresponding to a rating of 4 on the International grey scale.

The other organic derivative of cellulose materials mentioned above include such materials as other cellulose esters, e.g. cellulose propionate, cellulose butyrate, cellulose acetate-propionate, cellulose acetate-butyrate, and cellulose ethers such as ethyl and benzyl cellulose.

It is to be understood that the foregoing detailed description is given merely by way of illustration and that many variations may be made therein without departing from the spirit of our invention.

Having described our invention, what we desire to secure by Letters Patent is:

1. A yellow dyestuff having the formula:

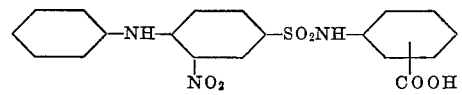

2. A yellow dyestuff having the formula:

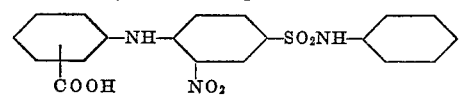

3. A yellow dyestuff having the formula:

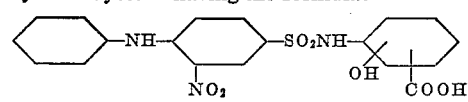

4. A yellow dyestuff having the formula

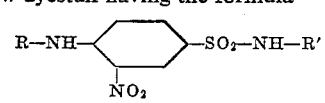

wherein R and R' are selected from the group consisting of phenyl, naphthyl, and biphenyl and the latter radicals substituted with lower alkoxy, chloro, hydroxyl, acetyl, hydroxy-lower alkoxy and hydroxy-lower alkyl, one of said radicals R and R' having a carboxyl substituent.

References Cited in the file of this patent

UNITED STATES PATENTS

| | | |
|---|---|---|
| 1,709,292 | Wagner | Apr. 16, 1929 |
| 2,080,704 | Fischer et al. | May 18, 1937 |
| 2,150,692 | McNally | Mar. 14, 1939 |
| 2,364,726 | Landolt | Dec. 12, 1944 |
| 2,416,884 | Schreiber | Mar. 4, 1947 |
| 2,480,775 | Ryan | Aug. 30, 1949 |
| 2,506,224 | Kopp et al. | May 2, 1950 |
| 2,595,359 | Hieserman | May 6, 1952 |
| 2,725,390 | Fogelman et al. | Nov. 29, 1955 |

FOREIGN PATENTS

| | | |
|---|---|---|
| 748,439 | France | Apr. 18, 1933 |
| 275,752 | Great Britain | Aug. 18, 1927 |

OTHER REFERENCES

Karrer: Organic Chemistry, Elsevier, Amsterdam Nordemann Publishing Company, Inc., New York (1938), p. 443.